(12) United States Patent
Williams, III (10) Patent No.: US 7,823,846 B2
(45) Date of Patent: Nov. 2, 2010

(54) UTILITY PORTAL FOR WALL CONSTRUCTION

(75) Inventor: William Baxter Williams, III, Troy, NC (US)

(73) Assignee: Williams Utility Portals, LLC, Albemarle, NC (US)

( * ) Notice: Subject to any disclaimer, the term of this patent is extended or adjusted under 35 U.S.C. 154(b) by 275 days.

(21) Appl. No.: 12/011,129

(22) Filed: Jan. 24, 2008

(65) Prior Publication Data

US 2008/0178542 A1 Jul. 31, 2008

Related U.S. Application Data

(60) Provisional application No. 60/897,632, filed on Jan. 26, 2007.

(51) Int. Cl.
*E04G 3/00* (2006.01)

(52) U.S. Cl. .................. 248/200.1; 248/68.1; 248/300; 248/909; 52/220.1; 52/696

(58) Field of Classification Search ................ 248/68.1, 248/57, 200, 300, 909, 200.1; 52/220.1, 52/696

See application file for complete search history.

(56) References Cited

U.S. PATENT DOCUMENTS

| | | | | |
|---|---|---|---|---|
| 1,767,575 A * | 6/1930 | Bujack | ...................... | 52/369 |
| 1,867,449 A * | 7/1932 | Ecket et al. | .................... | 52/100 |
| 2,103,064 A * | 12/1937 | Clark | .......................... | 52/696 |
| 2,751,652 A | 6/1956 | Epstein | .......................... | 24/73 |
| 2,884,670 A * | 5/1959 | Garrison et al. | ............. | 403/388 |
| 2,994,114 A * | 8/1961 | Black | .......................... | 52/317 |
| 3,111,722 A | 11/1963 | Smith | .............................. | 20/4 |
| 4,957,251 A * | 9/1990 | Hubbard | .................... | 248/68.1 |
| 5,277,005 A | 1/1994 | Hellwig et al. | ............. | 52/220.1 |
| 5,546,716 A | 8/1996 | Broxterman et al. | ....... | 52/220.1 |
| 5,953,871 A | 9/1999 | MacConnell et al. | ....... | 52/220.1 |
| 6,595,476 B1 * | 7/2003 | Edwards | .................. | 248/200.1 |
| 6,691,487 B2 * | 2/2004 | Daudet | ......................... | 52/846 |
| 7,053,300 B2 * | 5/2006 | Denier et al. | ................. | 174/58 |
| 7,134,252 B2 * | 11/2006 | Thompson | .................... | 52/712 |

* cited by examiner

*Primary Examiner*—Anita M King
(74) *Attorney, Agent, or Firm*—K&L Gates LLP (57) ABSTRACT

A rigid utility portal that can replace a removed or omitted section of the framing members of a wall construction that also includes stud, and that will permit the passage therethrough of electrical utilities, plumbing utilities, and/or HVAC without the necessity of drilling holes in the conventional wooden top framing plates which can destroy the integral between framing members and studs, and may include one or two skirt portions and one or strength of the wall. The utility portal may include a center portion for spanning the spacing two tab portions extending downwardly from the center portion.

17 Claims, 7 Drawing Sheets

UTILITY PORTAL FOR WALL CONSTRUCTION

CROSS-REFERENCE TO RELATED APPLICATIONS

This application is entitled to the benefit of, and claims priority to, provisional U.S. Patent Application Ser. No. 60/897,632 filed Jan. 26, 2007, and entitled "TOP PLATE UTILITY PORTAL FOR WALL CONSTRUCTION," the entirety of which is incorporated herein by reference.

BACKGROUND OF THE PRESENT INVENTION

The present invention relates generally to a rigid structural device, generally referred to herein as a utility portal, that can replace a removed or omitted section of the top framing plate or bottom framing plate of a wall construction, and that will permit the passage therethrough of electrical, plumbing utilities, and/or HVAC without the necessity of drilling holes in the conventional wooden top framing plates which can destroy the integral strength of the wall. Wall constructions generally include a number of elements that form an underlying frame, including a plurality of studs that extend vertically in spaced parallel relation, and a top plate that extends across the upper ends of the studs at the top of the wall construction and a bottom plate that extends across the bottom ends of the studs at the bottom of the wall construction. Since the utility portal of the present invention works equally well with either a top plate or a bottom plate of a wall construction, the term "framing member" will be used herein to define generically either a top plate or a bottom plate, unless otherwise indicated.

Figure 1:
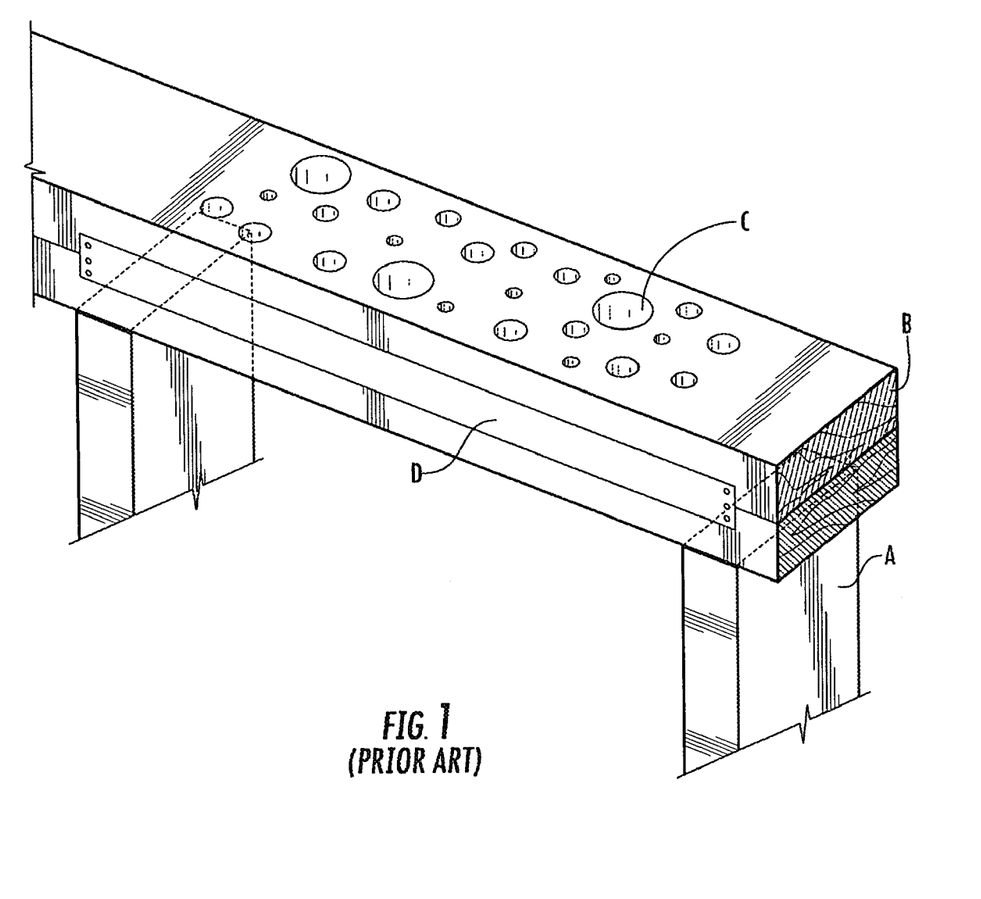
FIG. 1 is an illustration of a typical known prior art arrangement that uses metal straps attached to the side edges of the top framing plates as described above.

In typical wall constructions, one of which is illustrated in FIG. 1, it is common practice to have one or more framing members B (e.g. two top plates and one bottom plate) which are made of wood or metal and which extend over, under, and between adjacent pairs of studs A, which are typically made of wood or metal, that are spaced from one another. In such wall constructions, at least some of the framing members B must permit the passage therethrough of electrical utilities (e.g. wires and conduits), plumbing utilities (e.g. pipes), and HVAC utilities (e.g. hose and conduits) that extent upwardly and downwardly between the studs and generally parallel thereto, and it is therefore common practice to drill a large number of holes C in the framing members B to permit the electrical utilities, plumbing utilities, and/or HVAC utilities to pass through the holes. However, drilling or sawing a large number of holes C in the framing members B requires the use of drills and/or other equipment, and it is obviously a very labor intensive, and therefore expensive, process. More importantly, perhaps, the structural integrity of the wall construction is adversely affected by drilling numerous and sizable holes C in the framing members to permit the passage of the electrical wires, cables and conduits, and the like. In some cases, the structural integrity of the wall is adversely affected to the point where a portion of the wall becomes structurally defective or useless.

To offset the weakening effect of the holes drilled or otherwise formed in conventional top and bottom framing plates, it is common practice to attach metal straps D (one of which is illustrated in FIG. 1) to the sides of the framing members B to provide strength at the point where the drilled holes are found, and while this arrangement currently satisfies code requirements, it is still somewhat lacking in strength and stability, and it is also adds to the time and labor requirements as set forth above.

SUMMARY OF THE INVENTION

Briefly summarized, the present invention provides a rigid utility portal for installation in a wall construction that includes a pair of studs extending in spaced parallel relation to one another and at least two framing members connected to the studs with a spacing between the end walls of the framing members corresponding generally to the spacing between the studs. The utility portal includes a center portion having a width corresponding generally to the width of the framing members and a length that is at least as long as the spacing between the end walls of the framing members, with the center portion having a plurality of holes formed therein. There is at least one skirt portion extending generally perpendicularly from one side edge of the center portion, and the skirt portion has a length greater than the spacing between the studs. The utility portal also includes at least one tab portion extending generally perpendicularly from the center portion in the same direction as the extent of the skirt portion and in a plane generally perpendicular to the plane of the skirt portion, and it includes a plurality of fastener openings passing through the skirt portion and the tab portion, respectively, whereby fasteners can be inserted in the openings to connect the utility portal to the wall construction with the center portion of the utility portal spanning the spacing between the end walls of the framing members.

Preferably, the fastener openings in the skirt portion are located so that fasteners can be inserted in the framing members and in the studs, and the fastener openings in the tab portion are located so that fasteners can be inserted in the end walls of the framing members, and at least some of the openings in the center portion have knockouts therein which can be easily removed from such openings and they may have varying sizes.

In one embodiment of the present invention, the center portion has an extending length that is greater than the spacing between the end walls of the framing members so that both of the end portions of the center portion extend across the surface of the framing members, and the fastener openings extend through the end portions of the center portion and are located so that fasteners can be inserted in the framing members. In this embodiment, there may be two tab portions that are cut out of the end portions of the center portion, and there may be two skirt portions extending from each of the side edges of the center portion, with the two skirt portions having generally the same extending length as the center portion.

In another embodiment, the extending length of the center portion is generally equal to spacing between the end walls of the framing members, and there are two tab portions that extend generally perpendicularly from the ends of the center portion, respectively. In this embodiment, there may be two skirt portions that extend generally perpendicularly from the side edges of the center portion, respectively, and the extending length of the skirt portions may be greater than the length of the center portion and greater than the spacing between the end walls of the framing members.

In yet another embodiment, there may be only one skirt portion, and it will extend from one side edge of the center portion.

In all of the embodiments, it is preferred that the entire utility portal be cut from a sheet of metal, or other suitable approved materials.

The present invention also includes a method of installing a rigid utility portal in a wall construction that includes a pair of studs extending in spaced parallel relation to one another, with each stud having a side wall facing the other opposite stud and a front wall extending perpendicularly to the side walls, and at least two framing members connected to the studs with a spacing between the framing members corresponding generally to the spacing between the studs, each framing member having an end wall that faces the end wall of the other framing member, a top wall that extends generally perpendicularly to the end wall, and two side walls that extend generally perpendicularly from each side of the top surface. The method including the steps of: (a) providing a rigid utility portal as described above; (b) positioning the utility portal so that skirt portion overlies the side walls of the framing member and the front walls of the studs, respectively; with the tabs overlying the end walls of the framing members, respectively; and with the center portion spanning the spacing between the end walls of the framing members; and (c) inserting fasteners through the openings in the skirt portion to connect the skirt portion to the side walls of the framing members and to the front walls of the studs, and inserting fasteners into the openings in the tab portions to connect the tab portions with the end walls of the framing members, whereby the utility portal is securely mounted in the wall construction with the center portion spanning the spacing between the end walls of the framing members.

In one embodiment of the method of the present invention, the center portion of the utility portal has an extending length that is greater than the spacing between the end walls of the framing members and has fastener openings in the end portions of the center portion, and the step of positioning the utility portal includes positioning the end portions of the center portion so that they overlie the top walls of the framing members, and the inserting step includes inserting fasteners in the openings in the end portions to connect the end portions to the top walls of the framing members.

In another embodiment of the method of the present invention, the utility portal has two skirt portions, each extending generally perpendicularly from the side edges of the center portion, and the positioning step includes positioning the utility portal so that the two skirt portions overlie the side walls of the framing members and the front walls of the studs, and the inserting step includes inserting fasteners in the openings in the skirt portions to connect the skirt portions to the side walls of the framing members and to the front walls of the studs.

DESCRIPTION OF THE PREFERRED
EMBODIMENTS OF THE PRESENT
INVENTION

Figure 2:
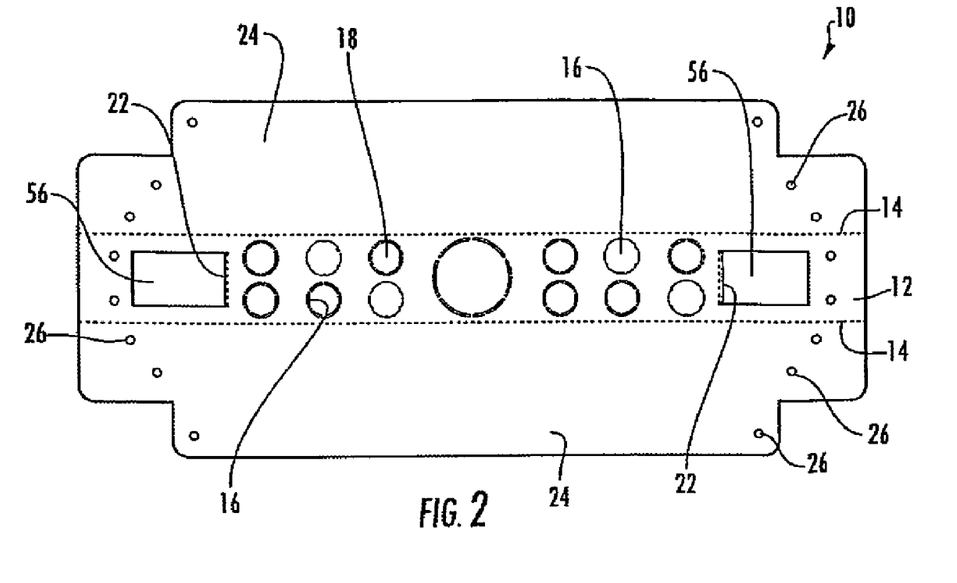
FIG. 2 is a plan view of one embodiment of the present invention in a flat configuration as it would be stamped.
Figure 3:
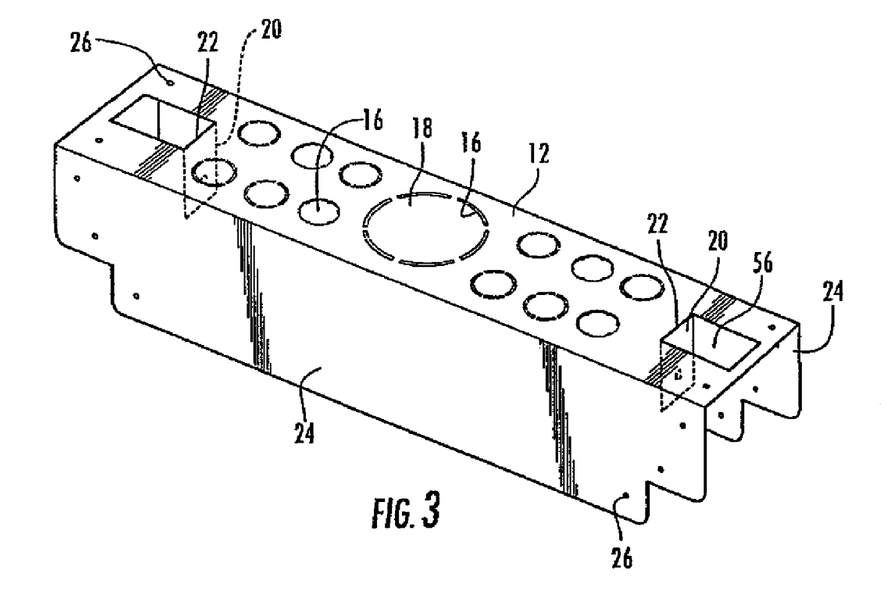
FIG. 3 is a perspective view of the embodiment of the utility portal illustrated in FIG. 2.
Figure 4:
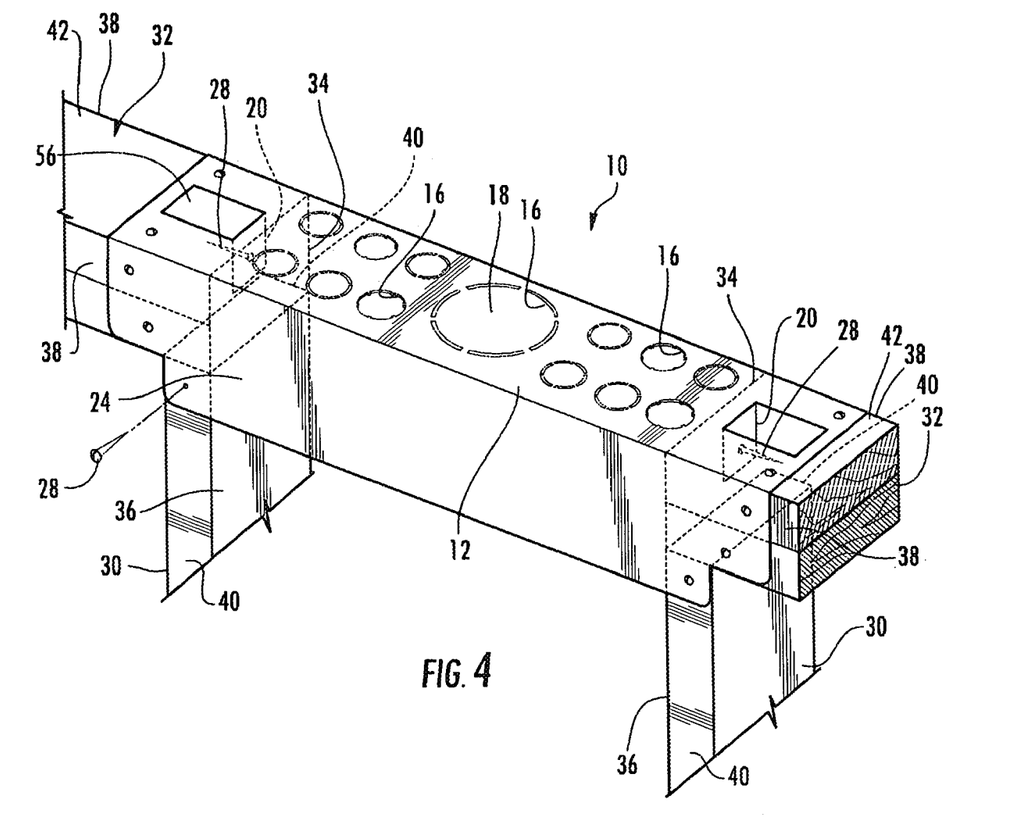
FIG. 4 illustrated the embodiment of the utility portal shown in FIG. 3 installed on top framing plates.

Looking now in greater detail at the accompanying drawings, FIGS. 2, 3 and 4 illustrate one preferred embodiment of the utility portal 10 of the present invention. As best seen in FIG. 2, the blank from which the utility portal 10 is made is illustrated, and this blank is preferably laser cut from a sheet of metal, but it can be cut using any of a variety of known methods, such as, for example, punching, shearing, stamping, and the like. As best seen in FIGS. 2 and 3, the utility portal 10 includes a center portion 12, which is the portion between the fold lines 14 illustrated in FIG. 2. The center portion is formed with a plurality of openings 16, some of which are shown as open and some of which are shown as being covered by conventional knockouts 18. It will be expressly understood that in this embodiment of the present invention, and in the two embodiments that are described in greater detail below, the number, size, and pattern of the holes 16 in the center portion 12 may vary considerably depending on the particular application of the utility portion portal 10, and the particular number, size and pattern illustrated in FIGS. 2-4 is illustrative of one possible arrangement of the holes 16. It will also be understood that some or all of the holes 16 may be open, and some or all of the holes 16 may be provided with knockouts 18. In use, the holes 16 will have conventional grommets (not shown) inserted therein in some applications of the present invention, particularly when electrical wires or water supply lines pass through the openings 16. Additionally, both end portions of the center portion 12 have cutouts along three sides of the opening 56, and two tab portions 20 are bent or folded downwardly at fold lines 22 so that the tab portions 20 extend generally perpendicularly from the center portion 12.

The utility portal 10 also includes two skirt portions 24 on each side of the center portion 12, and these skirt portions 24 are folded or bent downwardly along the fold lines 14 so that they extend generally perpendicularly from each side edge of the center portion 12. As best seen in FIG. 3, the tab portions 20 extend downwardly in a plane that is perpendicular to the plane of the skirt portions 24. The center portion 12, tab portions 20, and skirt portions 24 are all formed with openings 26 through which fasteners 28 can be inserted to secure the utility portal in place in a wall construction as will be described in greater detail below.

The utility portal 10 of the present invention may be used in a variety of different wall constructions, one typical example being illustrated in FIG. 4. The wall construction includes a pair of conventional studs 30, usually made of wood, extending vertically in spaced parallel relation to one another, and at least two top framing members 32 that extend generally horizontally and that are connected to the upper ends of the studs 30. The wall construction will normally also includes identical framing members (not shown) located at the bottom of the studs 30. In a typical wall construction, there is a unitary framing member that extends all the way across the spacing between the studs 30, as illustrated in FIG. 1. However, in accordance with the present invention, the portion of the framing member that is between the studs 30 is cut away entirely and removed, which leaves the two framing members 32 having end faces 34 which extend vertically in parallel relation to the facing sidewalls 36 of the two studs 30 so that the area between the end faces 34 is entirely open. Alternatively, instead of cutting away the portion a unitary framing member that extends across the spacing between the studs 30, two separate framing members may be used, with each such framing member being mounted on just one of the studs 30, respectively, with the end face 34 of each framing member extending in parallel with the inside facing walls 36 of the studs 30, as illustrated in FIG. 4.

To install the utility portal 10, it is positioned above the framing members 12 with the center portion aligned with the framing members 32, and with the skirt portions 24 and the tab portions 20 extending downwardly. The utility portal is then placed on the wall construction as illustrated in FIG. 4 so that the skirt portions 24 extend downwardly on each side of the framing members 32 so that they overlie both the sidewalls 38 of the framing members 32 and front and back walls 40 of the studs 30. Also, the two tab portions 20 extend downwardly so that they overlie the upper portion of the sidewalls 36 of the studs 30. It will be noted that there are open spaces 56 in the end portions of the center portion 12 that are left when the tab portions 20 are bent downwardly, and these openings 56 provide a space for fastening a ceiling joist (not shown), if needed. Once the utility portal 10 is in place, the fasteners 28, which may be screws, nails, or any equivalent fastener device, are inserted through the openings 26 in the center portion 12, the two skirt portions 24, and the two tab portions 20.

It will be noted that in this embodiment of the present invention, the center portion 12 has a width which corresponds generally to the width of the framing members 32, and it has a length that extends beyond the spacing between the studs so that the end portions of the center portion overlie the top surface 42 of the framing members 32. Also, it will be noted that the skirt portions 24 also have a length that is greater than the spacing between the studs 30 so that the end portions thereof extend along the sidewalls 38 of both framing members 32, and, preferably, will have a height of at least five inches.

Accordingly, in the embodiment of the invention which is illustrated in FIGS. 2, 3 and 4, the utility portal 10 is secured in place in the wall construction by a plurality of fasteners 28 that attach the utility portal 10 to the top surface 42 of the framing members 22, the sidewalls 38 of the framing members 32, the front and back faces 40 of the studs 30, and the inside facing walls 36 of the studs 30, all of which provides a tight, secure fit that adds structural integrity to the wall construction while locating the center portion 12, with its plurality of holes 16, so that it spans the spacing between the studs 30 for a purpose to be described in greater detail below.

It will be understood, of course, that the thickness or gage of the metal used to form the utility portal 10, and the specific dimensions of the various portions thereof will vary, depending on the particular application of the present invention. However, by way of illustration, it has been found that good results are obtained if the utility portal 10 is formed of 16 gage corrosive resistance steel. If the studs 30 are spaced apart by 12 inches on center, which is typical in some applications, the length of the center portion 12 and the skirt portions 24 is preferably 18.75 inches long, and when the studs 30 are placed with a spacing of 16 inches on center, the length of the center portion 12 and skirt portions 24 would preferably be 22.75 inches, and, finally, for a 24 inch spacing on center, the length of the center portion 12 and the skirt portions 24 would preferably be 30.75 inches.

The first embodiment of the present invention, which is illustrated in FIGS. 2, 3 and 4, will have particular application in a construction project for installation of the utility portal 10 while framing the wall construction. In this case, there is plenty of room to position the utility portal 10 relative to the studs 30 and the framing members 32 for installation as described above.

Figure 5:
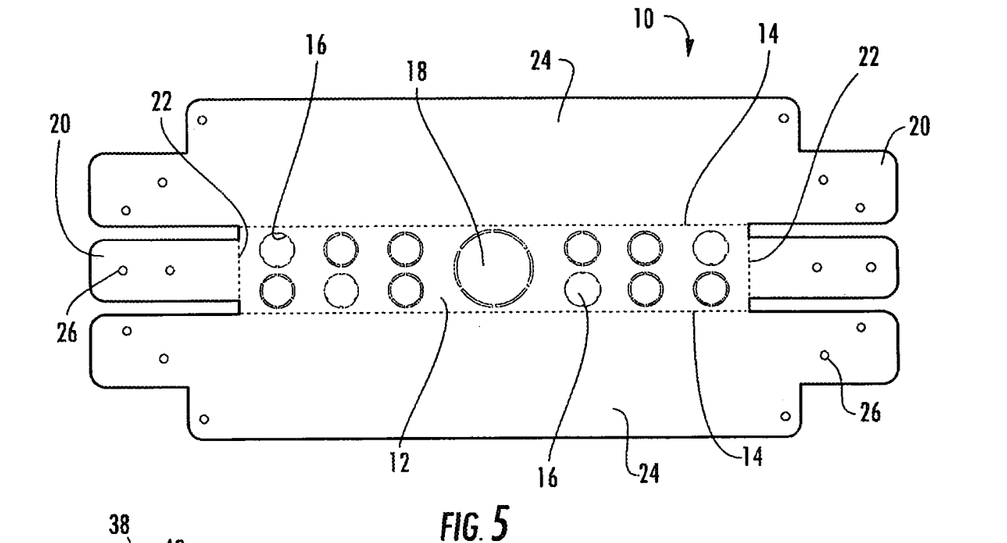
FIG. 5 is a plan view of another embodiment of the utility portal of the present invention.
Figure 6:
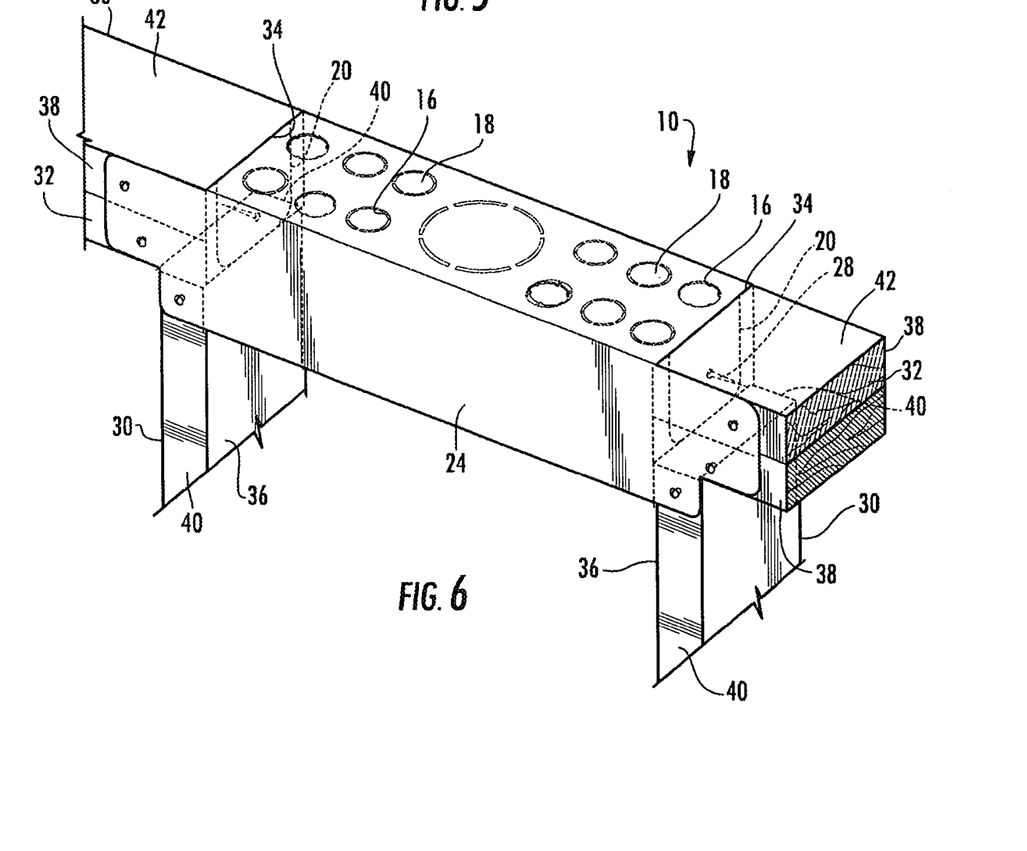
FIG. 6 illustrates the embodiment of the utility portal shown in FIG. 5 installed on top framing plates.

A second embodiment of the present invention is shown in FIGS. 5 and 6, and the reference numerals used above in describing the first embodiment of the present invention are also used to identify like elements in the embodiments illustrated in FIGS. 5 and 6.

In this embodiment, the skirt portions 24 are identical to those described above, but the center portion 12 has a reduced length compared to the first embodiment, and this length generally corresponds to the actual spacing between the sidewalls 36 of the studs 30. Moreover, the tab portions 20 extend outwardly from the ends of the center portion 12, rather than being cut out of the center portion, and these tab portions 20 are bent downwardly along fold lines 22 at the outermost edges of the center portion 12.

Accordingly, when this embodiment of the utility portal 10 is placed on the studs 30 and the framing members 32, it will be noted that the extending length of the center portion 12 corresponds to the spacing between the studs 30, and the center portion does not include any end portions that overlie the top surfaces 42 of the framing member 32, or the bottom surface of the framing member when it is a bottom plate.

The embodiment of the present invention which is illustrated in FIGS. 5 and 6 will have particular application where the exterior perimeter wall construction of the structure has been "dried in", which means that wall construction has been completed with only the inside of the wall left uncovered. The wall construction will have the ceiling joists in place which will make it impossible to position the utility portal 10 for sliding down over the studs 30 and the framing members as described above in connection with the first embodiment. This embodiment of the present invention is designed to be installed in interior wall applications. Since the center portion 12 in the second embodiment has a reduced length, the opposite ends of the utility portal 10 are open between the ends of the two skirt portions 24, and the utility portal can be installed by locating it at an angle below space vacated by the removal of a portion of the top plate framing members 32 with the skirt portions 24 at one open end of the utility portal 10 being positioned about one of the studs 30, and then sliding the other end upwardly to locate the other open end about the other stud 30, after which the utility portal can be secured in place by the fasteners 28. By reversing the installation procedure described above, at the space vacated by removal of a portion of the bottom plate framing member 32, and by inverting the utility portal, this embodiment of the present invention can also be used as a bottom utility portal for the passage of utilities into the basement or crawl space of a structure.

Figure 7:
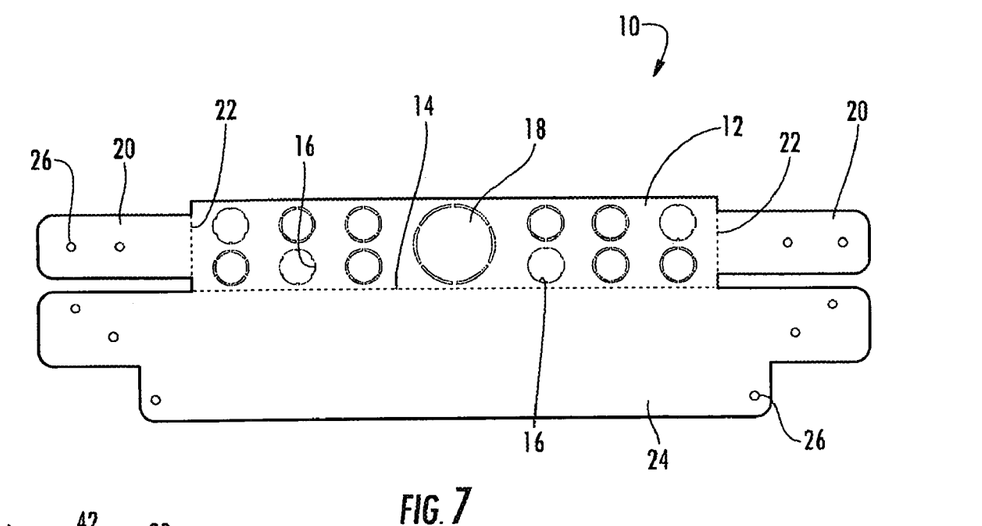
FIG. 7 is a plan view of yet another embodiment of the utility portal of the present invention.
Figure 8:
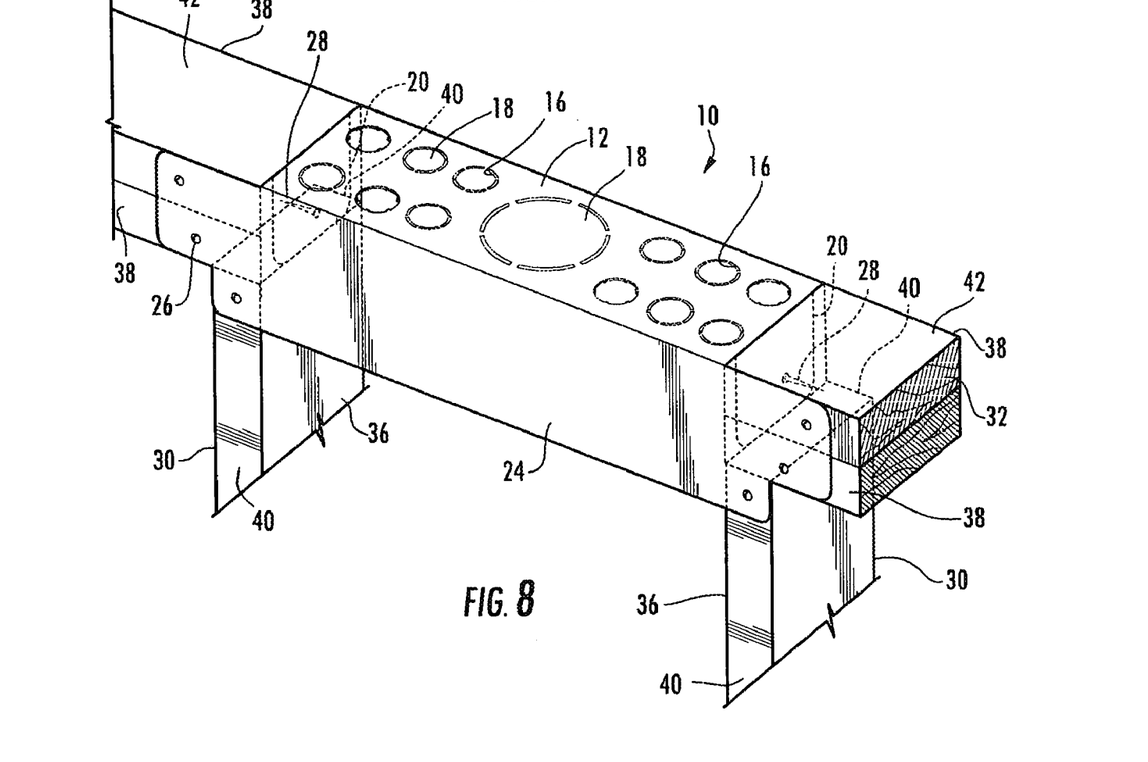
FIG. 8 illustrates the embodiment of the utility portal illustrated in FIG. 7 installed on top framing plates.

A third embodiment of the present invention is illustrated in FIGS. 7 and 8, and, again, like reference numerals will be used to identify the elements of this embodiment. The embodiment illustrated in FIGS. 7 and 8 is identical to the embodiment of the invention previously described in connection with FIGS. 5 and 6, except that one of the skirt portions 24 has been eliminated. Accordingly, when the utility portal 10 is installed as illustrated in FIG. 8, the center portion 12 has a length corresponding generally to the spacing between the studs 30, and the utility portal 10 is secured to the studs 30 and the framing member 32 by fasteners inserted through the openings 26 in the single skirt portion 24, and the two tab portions 20.

The embodiment of the present invention which is illustrated in FIGS. 7 and 8 are used in wall constructions that have been "dried in" and where it has been determined to be more feasible for the utility portal 10 to be installed on the exterior perimeter wall of the structure. Since the embodiment in FIGS. 7 and 8 has only one skirt portion 24, it can easily put in place by simply removing the desired section of the framing members 32 between the studs 30 and sliding the center portion 12 horizontally into the space vacated by the removal of a portion of the framing members 32 until the single skirt portion 24 abuts the side walls of the framing members 32 and the front sides 40 of the adjacent studs 30.

Figure 9:
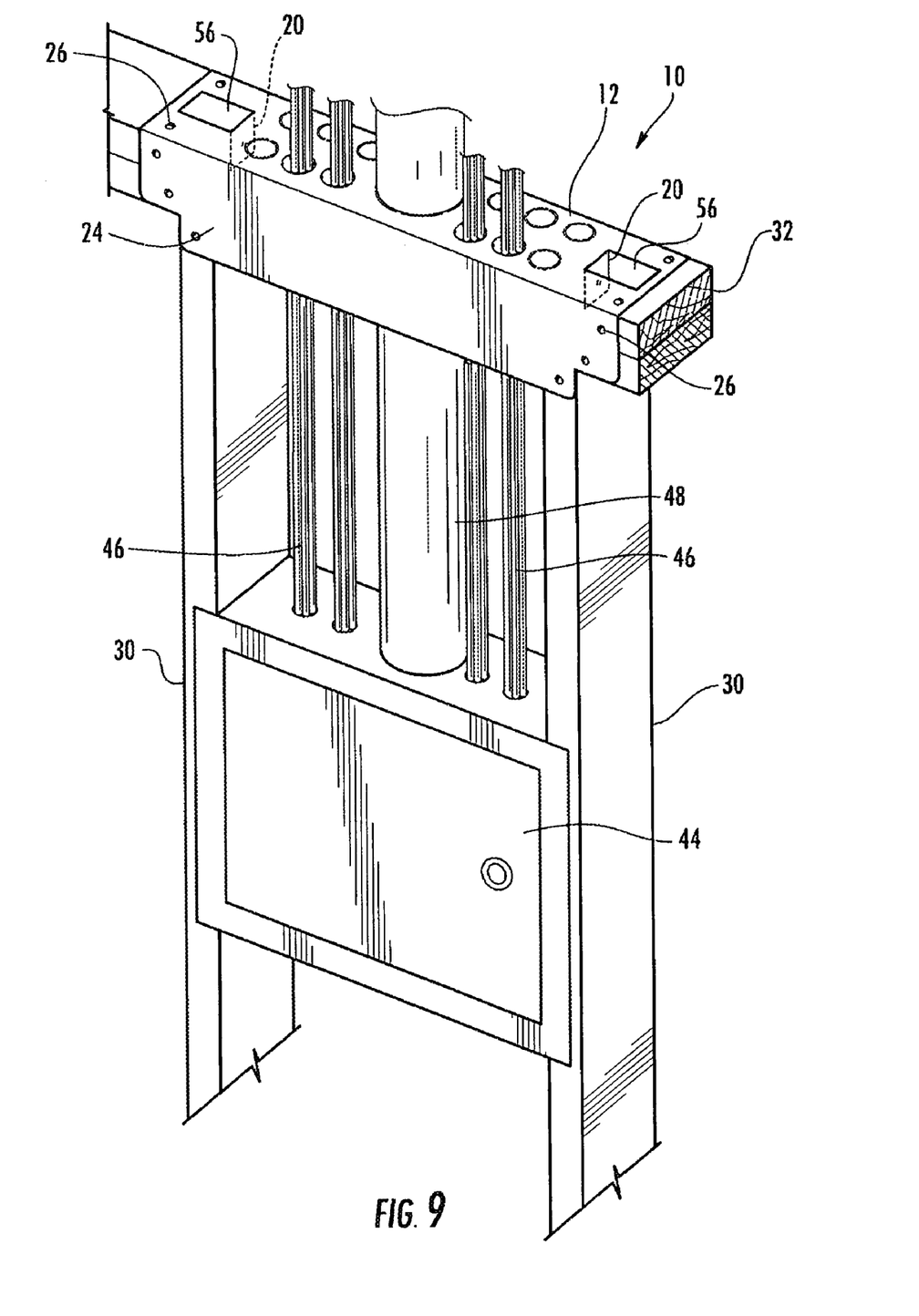
FIG. 9 illustrates a typical installation of a utility portal according to the present invention in which electrical lines extend through openings in the utility portal from an electrical service panel.

FIG. 9 illustrates one typical application of the utility portal 10 of the present invention where electrical components are mounted in the spacing between the studs 30 and extend upwardly and downwardly. For example, an electrical junction box 44 is mounted between the studs 30, and a plurality of wire bundles 46 extend upwardly through selected ones of the holes 16 in the center portion 12 of the utility portal 10. Similarly, a wiring conduit 48 can also extend upwardly through another one of the holes 16. As discussed above, the selected holes 16 through which the wiring bundles 46 and the wiring conduit 48 pass can be open when the utility portal 10 is installed in the wall construction, or, if desired, all of the holes 16 may be covered with the conventional knockouts 18, in which case the knockouts 18 may be removed from the selected holes 16 after the utility portal 10 is installed. One of the significant advantages of the present invention will be apparent from the illustration of the application of the utility portal 10 in FIG. 9. More specifically, and as discussed in greater detail above, in conventional wall constructions, the framing member extends all the way across the spacing between the studs 30, and it will be apparent that the workman constructing the wall construction must determine the location at which the wiring bundles 46 and the wiring conduit 48 will pass through the portion of the framing member between the studs 30, and tools, such as large drills or saws, must then be manipulated between the relatively narrow spacing between the studs 30 so that the passageways and the framing member can be individually cut, all of which involve time and labor that is expensive, and, as also discussed above, these cut away passageways in the framing member will significantly reduce the structural integrity of the framing members 32, and the wall construction generally; because of the presence of the passageways and the lost material removed to form the passageways.

By substantial contrast, it will be noted that the problem of providing passageways for the wiring bundles 46 and wiring conduit 48 is substantially simplified by the present invention in that it is only necessary to install the utility portal 10, and then remove any knockouts 18 from appropriate ones of the plurality of holes 16, which requires no sophisticated tools or expertise. Finally, it will also be apparent that the rigidity of the metal utility portal 10 will actually add strength to the wall construction, as compared with framing members, either with or without the passageways that must be formed therein.

Figure 10:
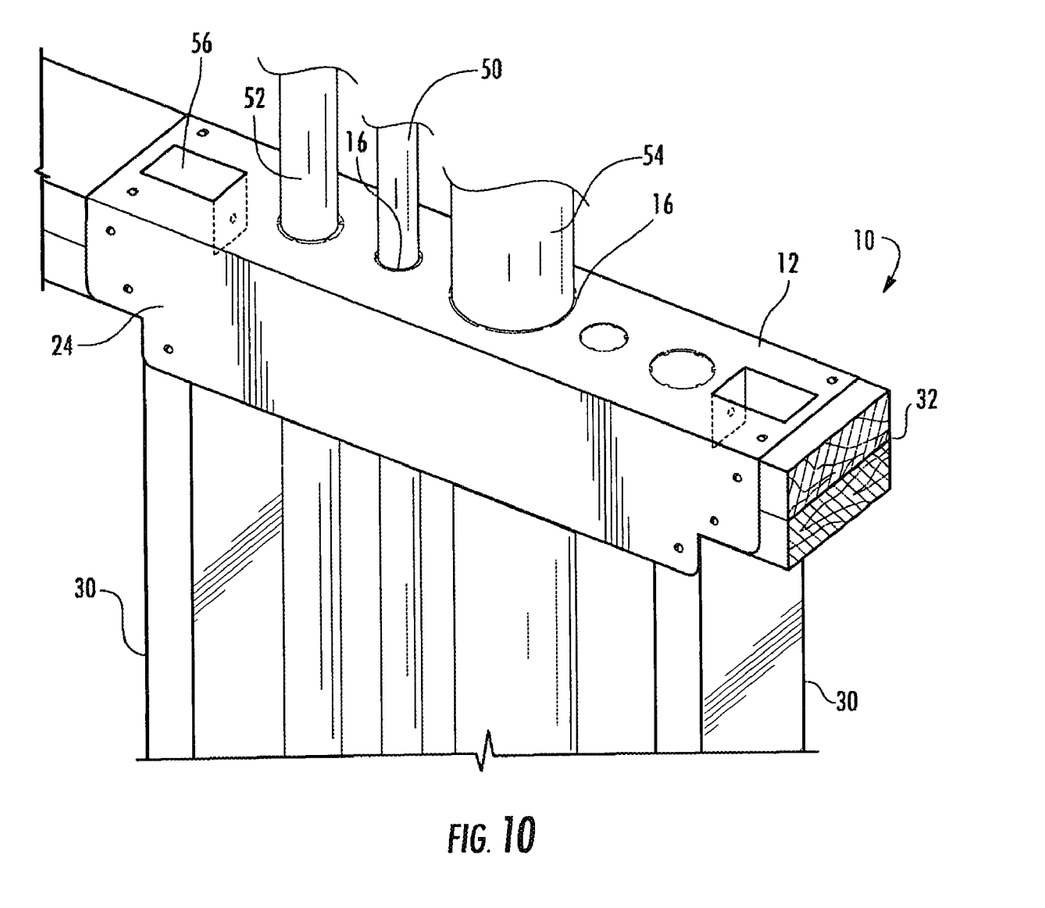
FIG. 10 is an illustration of another typical installation of the utility portal of the present invention in which plumbing pipes extend through openings in the utility portal.

Another application of the present invention is illustrated in FIG. 10, which is similar to the application illustrated in FIG. 9, except that the application illustrated in FIG. 10 is directed to a plumbing application where a variety of conduits which must extend upwardly and downwardly in the spacing between the studs 30 and through the framing members 32. For example, typical plumbing conduits include a vent 50, a supply conduit 52, and a drain conduit 54, each of which may be of a different size. As with the embodiment described above in connection with FIG. 9, it is a simple matter, using the, utility portal 10 of the present invention, to remove the knockouts 18 from the holes 16 that are most suitably sized and arranged to permit the passage of the vent 50, the supply conduit 52, and the drain conduit 54. Accordingly, in this representative application of the present invention, all of the advantages obtain from the present invention, as described above, would also be obtained in this application.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A rigid utility portal for installation in a wall construction that includes a pair of studs extending in spaced parallel relation to one another and at least two framing members connected to the studs with a spacing between end walls of the framing members corresponding generally to the spacing between the studs, the utility portal including;
    a center portion having a width corresponding generally to the width of the framing members and a length that is at least as long as the spacing between the end walls of the framing members, the center portion having a plurality of holes formed therein;
    at least one skirt portion extending generally perpendicularly from one side edge of the center portion, the skirt portion having a length greater than the spacing between the studs;
    at least one tab portion extending generally perpendicularly from the center portion in the same direction as the extent of the skirt portion and in a plane generally perpendicular to the plane of the skirt portion; and
    a plurality of fastener openings passing through the skirt portion and the tab portion, respectively, whereby fasteners can be inserted in the openings to connect the utility portal to the wall construction with the center portion of the utility portal spanning the spacing between the end walls of the framing members.

2. A utility portal as defined in claim 1, wherein the fastener openings in the skirt portion are located so that fasteners can be inserted in the framing members and in the studs, and wherein the fastener openings in the tab portion are located so that fasteners can be inserted in the end walls of the framing members.

3. A utility portal as defined in claim 1, wherein at least some of the openings in the center portion have knockouts therein which can be easily removed from such openings.

4. A utility portal as defined in claim 1, wherein the holes in the center portion have varying sizes.

5. A utility portal as defined in claim 1, wherein the entire utility portal is cut from a sheet of metal.

6. A utility portal as defined in claim 1, wherein the center portion has an extending length that is greater than the spacing between the end walls of the framing members so that respective end portions of the center portion extend across the surface of the framing members, and wherein fastener openings extend through the end portions of the center portion and are located in the so that fasteners can be inserted in the framing members.

7. A utility portal as defined in claim 6, wherein there are two tab portions, and each tab portion is cut out of the end portions of the center portion, respectively.

8. A utility portal as defined in claim 6, wherein there are two skirt portions extending generally perpendicularly from the center portion at opposite side edges of the center portion.

9. A utility portal as defined in claim 8, wherein both skirt portions have a length corresponding to the length of the center portion.

10. A utility portal as defined in claim 1, wherein the extending length of the center portion is generally equal to spacing between the end walls of the framing members, and wherein there are two tab portions that extend generally perpendicularly from the ends of the center portion, respectively.

11. A utility portal as defined in claim 10, wherein there are two skirt portions that extend generally perpendicularly from the side edges of the center portion, respectively, and wherein the extending length of the skirt portions is greater than the length of the center portion and greater than the spacing between the end walls of the framing members.

12. A utility portal as defined in claim 1, wherein there is only one skirt portion that extends generally perpendicularly from only one side edge of the center portion.

13. A rigid utility portal for installation in a wall construction that includes a pair of studs extending in spaced parallel relation to one another, with each stud having a side wall facing the other stud and a front wall extending perpendicularly to the side wall, and at least two framing members connected to the studs with a spacing between the framing members corresponding generally to the spacing between the studs, each framing member having an end wall that faces the end wall of the other framing member, a top wall extending perpendicularly to the end wall, and two side walls extending perpendicularly from each side of the top wall, the utility portal including;
   a center portion having a width corresponding generally to the width of the end wall of the framing members and a length that is greater than the spacing between the end walls of the framing members, whereby both end portions of the center portion can overlie the top walls of the framing members, respectively, with the center portion having a plurality of holes formed therein at least some of which have a knockouts that can be easily removed from such openings;
   two skirt portions extending generally perpendicularly from the opposite side edges of the center portion, with both skirt portions having a length greater than the spacing between the end walls of the framing members so that extending end portions of the skirt portions can overlie the side walls of the framing members and the front walls of the studs; and
   a plurality of fastener openings passing through the center portion and the skirt portions, respectively, whereby fasteners can be inserted in the openings to connect the center portion to the top wall of the framing member, to connect the skirt portions to the side walls of the framing member and to the front walls of the stud with the center portion of the utility portal spanning the spacing between the end walls of the framing members.

14. A rigid utility portal as defined in claim 13, wherein the utility portal includes two tab portions that are cutout from the end portions of the center portion and extend generally perpendicularly from the center portion in the same direction as the extent of the skirt portion and in a plane generally perpendicular to the plane of the skirt portion so that the tab portions can overlie the end walls of the framing members, respectively.

15. A rigid utility portal for installation in a wall construction that includes a pair of studs extending in spaced parallel relation to one another, with each stud having a side wall facing the other stud and a front wall extending perpendicularly to the side wall, and at least two framing members connected to the studs with a spacing between the framing members corresponding generally to the spacing between the studs, each framing member having an end wall that faces the end wall of the other framing member, a top wall extending perpendicularly to the end wall, and two side walls extending perpendicularly from each side of the top wall, the utility portal including;
   a center portion having a width corresponding generally to the width of the top wall of the framing members and a length that is generally equal to the spacing between the end walls of the framing members, the center portion having a plurality of holes formed therein;
   two skirt portions extending generally perpendicularly from opposite side edges of the center portion, with both skirt portions having a length greater than the spacing between the end walls of the framing members so that the extending end portions of the skirt portions can overlie the side walls of the framing members; and
   a plurality of fastener openings passing through the skirt portion, whereby fasteners can be inserted in the openings in the skirt portions to connect the skirt portions to the side walls of the framing members and to the front walls of the studs, with the center portion of the utility portal spanning the spacing between the end walls of the framing members.

16. A rigid utility portal as defined in claim 15, wherein the utility portal includes two tab portions extending generally perpendicularly from extending ends of the center portion in the same direction as the extent of the skirt portion and in a plane generally perpendicular to the plane of the skirt portion so that the tab portions can overlie the end walls of the framing members, respectively, with each tab portion having a plurality of fastener openings passing therethrough, whereby fasteners can be inserted through such openings and into end walls of the framing members.

17. A rigid utility portal for installation in a wall construction that includes a pair of studs extending in spaced parallel relation to one another, with each stud having a side wall facing the other stud and a front wall extending perpendicularly to the side wall, and at least two framing members connected to the studs with a spacing between the framing members corresponding generally to the spacing between the studs, each framing member having an end wall that faces the end wall of the other framing member, a top wall extending perpendicularly to the end wall, and two side walls extending perpendicularly from each side of the top wall, the utility portal including;
   a center portion having a width corresponding generally to the width of the framing members and a length that is generally equal to the spacing between the end walls of the framing members, the center portion having a plurality of holes formed therein;
   one skirt portion extending generally perpendicularly from one side edge of the center portion, the skirt portion having a length greater than the spacing between the studs and the spacing between the end walls of the framing members whereby end portions of the skirt portion can overlie the front walls of the studs and one of the side walls of the framing members, respectively;

a plurality of fastener openings passing through the skirt portion and the tab portion, respectively, whereby fasteners can be inserted in the openings in the skirt member to connect the skirt portion to the side walls of the framing members and to the front walls of the studs, with the center portion of the utility portal spanning the spacing between the end walls of the framing members; and two tab portion extending generally perpendicularly from extending ends of the center portion in the same direction as the extent of the skirt portion and in a plane generally perpendicular to the plane of the skirt portion so that the tab portions can overlie the end walls of the framing members, respectively, and with each tab portion having a plurality of fastener openings passing therethrough, whereby fasteners can be inserted through such openings and into end walls of the framing members.

\* \* \* \* \*